(12) United States Patent
Ower

(10) Patent No.: US 6,847,941 B2
(45) Date of Patent: Jan. 25, 2005

(54) METHOD AND DEVICE FOR CENTRAL SUPPLY CONTROL

(75) Inventor: Iain Ower, Brafileld on the Green (GB)

(73) Assignee: Volkswagen AG, Wolfsburg (DE)

( * ) Notice: Subject to any disclaimer, the term of this patent is extended or adjusted under 35 U.S.C. 154(b) by 368 days.

(21) Appl. No.: 09/935,177

(22) Filed: Aug. 22, 2001

(65) Prior Publication Data

US 2002/0128913 A1 Sep. 12, 2002

(30) Foreign Application Priority Data

Aug. 22, 2000 (JP) ....................................... 2000-250452

(51) Int. Cl.$^7$ .............................................. G06F 17/60
(52) U.S. Cl. .......................................... 705/28; 705/22
(58) Field of Search ..................................... 705/28, 29

(56) References Cited

U.S. PATENT DOCUMENTS

| | | | |
|---|---|---|---|
| 5,712,989 A | | 1/1998 | Johnson et al. ............. 395/228 |
| 5,765,143 A | | 6/1998 | Sheldon et al. ............... 705/28 |
| 5,878,416 A | * | 3/1999 | Harris et al. .................. 707/10 |
| 6,081,789 A | * | 6/2000 | Purcell ......................... 705/37 |
| 6,115,641 A | * | 9/2000 | Brown et al. ............... 700/102 |
| 6,343,273 B1 | * | 1/2002 | Nahan et al. .................. 705/5 |
| 6,446,045 B1 | * | 9/2002 | Stone et al. .................. 705/26 |
| 6,587,827 B1 | * | 7/2003 | Hennig et al. ................ 705/1 |
| 6,622,127 B1 | * | 9/2003 | Klots et al. .................. 705/28 |

FOREIGN PATENT DOCUMENTS

WO    WO 99 14698    3/1999

\* cited by examiner

*Primary Examiner*—Richard Chilcot
(74) *Attorney, Agent, or Firm*—Kenyon & Kenyon

(57) ABSTRACT

A method and a device for central supply control of products having long delivery times from their manufacturing site to the dealers, including a data network having at least one central data bank, each dealer being allocated a computer for making inquiries to the centrally managed data in the data bank, the inventories in the data bank being divided into at least two process steps, and the inventories being allocated to at least one of the individual importers and dealers, the individual allocated inventories being subdivided into free inventories, non-free inventories and inventories allocated to consumers, a search inquiry for a desired product may be initiated by a dealer and/or importer in the central data bank using the computer, the search extending to inventories which:

- have not yet been allocated to a consumer (free and non-free inventories);
- have not yet been allocated to a dealer (free inventories);
- have been allocated to another dealer but can be acquired without negotiation (free inventories); and
- have been allocated to another dealer but can be acquired only after negotiation with this dealer;

where the sequence of the search inquiry among the individual inventories may be made to depend on additional conditions which may be stipulated by the dealer and/or the device, and a product that has been located can be acquired for the dealer and transferred to his allocation.

19 Claims, 9 Drawing Sheets

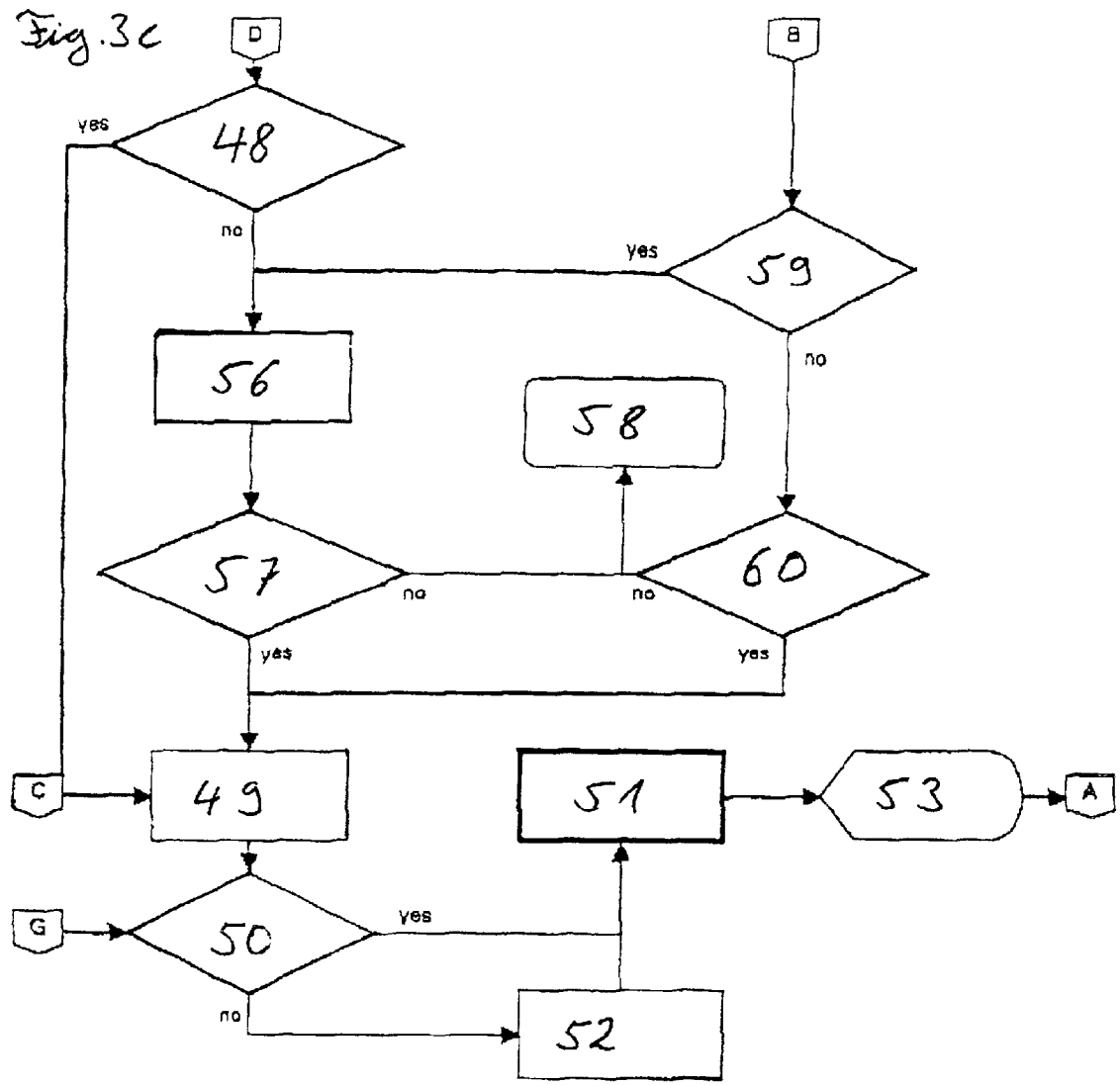

Fig. 4

Dealer......... 349   Windrush Garage Limited                                                        More: +

| Model Group | Restrictions - Stock & Transit Min | Stock & Transit Max | Prod Min | Prod Max | Acquisitions - Stock & Transit | Acquisitions Prod |
|---|---|---|---|---|---|---|
| Lupo | 0 | 4* | 2 | 3 | 3- | 0 |
| New Polo | 0 | 10* | 14 | 27 | 2 | 11 |
| Polo Saloon | 0 | 2* | 0 | 1 | 1- | 0 |
| Polo Estate | 0 | 2* | 0 | 0 | 1- | 0 |
| Golf | 0 | 29* | 13 | 44 | 8- | 16 |
| Golf SA | 0 | 0* | 0 | 0 | 0 | 0 |
| Golf Cabriolet | 2 | 5* | 1 | 2 | 0 | 0 |
| Golf Estate | 0 | 3* | 1 | 4 | 1- | 0 |
| Beetle | 0 | 3* | 2 | 3 | 2- | 0 |
| Bora | 0 | 7* | 6 | 11 | 3- | 2 |
| Passat Estate | 0 | 6* | 5 | 10 | 1 | 6 |
| Passat Saloon | 9 | 23* | 18 | 31 | 1- | 23 |
| Sharan | 0 | 4* | 2 | 4 | 0 | 0 |
| Total | 11 | 98 | 64 | 140 | 17- | 58 |

CUT OFF DATE FOR ACQUISITIONS/FACTORY ORDERING 30/04/01, "*" = UNRESTRICTED
Fastpath _____ Data                                                                                Rtn
Enter F1=Help    F3=Exit    F7=Bkwd    F12=Cancel    F13=Prev month    F14=Next month
F15=Quit   F17=Consignments    F18=Res parameters   F21=Fastpath    F22=Acq summary

Fig. 5

Dealer ........: 349  Windrush Garage Limited                                                      More:  +

| Model Group | Importer Alloc | De-al | Trans-In Mand | Trans-In Neg | Trans-Out Mand | Trans-Out Neg | Total |
|---|---|---|---|---|---|---|---|
| Lupo | | | | | | | |
| New Polo | | | 2 | | 2- | 1- | 3- |
| Polo Saloon | | | | 4 | 2- | 2- | 2 |
| Polo Estate | | | | | | 1- | 1- |
| Golf | 1 | | 3 | | 1- | | 1- |
| Golf SA | | 1- | | 6 | 10- | 7- | 8- |
| Golf Cabriolet | | | | | | | |
| Golf Estate | 1 | | 1 | | 1- | | 1- |
| Beetle | | | 1 | | 3- | 1- | 2- |
| Bora | | | | 1 | 4- | | 3- |
| Passat Estate | 1 | | | | | | 1 |
| Passat Saloon | | | | 4 | 4- | 2- | 1- |
| Sharan | | | | | | | |
| Total | 3 | 1- | 7 | 15 | 27- | 17- | 17- |

Fastpath _____  Data _____                                                    Rtn
F1=Help    F3=Exit    F7=Bkwd    F12=Cancel    F15=Quit    F17=Non-quota managed supply
F21=Fastpath    F22=Acq summary

Fig. 6

National                                                                                    More:    +

|  | ------- Restrictions ------- | | | | ------- Acquisitions ------- | |
|  | Stock & Transit | | Prod | | Stock & | |
| Model Group | Min | Max | Min | Max | Transit | Prod |
| Lupo | 26 | 702* | 320 | 593 | 27 | 192 |
| New Polo | 33 | 2007* | 2533 | 5020 | 23 | 1238 |
| Polo Saloon | 6 | 502* | 60 | 300 | 6 | 3 |
| Polo Estate | 6 | 486* | 54 | 276 | 2 | 7 |
| Golf | 2 | 3019* | 1284 | 4527 | 428 | 1798 |
| Golf SA | 0 | 19* | 8 | 0 | 0 | 0 |
| Golf Cabriolet | 32 | 322* | 66 | 276 | 9- | 41 |
| Golf Estate | 28 | 412* | 173 | 607 | 4 | 120 |
| Beetle | 70 | 613* | 423 | 717 | 19 | 291 |
| Bora | 12 | 708* | 551 | 1006 | 21 | 175 |
| Passat Estate | 84 | 499* | 380 | 762 | 37 | 362 |
| Passat Saloon | 153 | 996* | 1130 | 2042 | 39 | 1047 |
| Sharan | 27 | 395* | 176 | 404 | 9- | 82 |
| Total | 479 | 10680 | 7158 | 16530 | 588 | 5356 |

CUT OFF DATE FOR ACQUISITIONS/FACTORY ORDERING 30/04/01, "*" = UNRESTRICTED
Fastpath _____  Data                                                               Rtn  _
F1=Help    F3=Exit    F8=Bkwd    F12=Cancel    F13=Prev month    F14=Next month    F15=Quit
F21=Fastpath    F22=Acq summary

Fig. 7

National                                                                                                More: +

| Model Group | Importer Alloc | De-al | Trans-In Mand | Neg | Trans-Out Mand | Neg | Total |
|---|---|---|---|---|---|---|---|
| Lupo | 41 | 4- | 163 | 39 | 173- | 39- | 27 |
| New Polo | 53 | 28- | 635 | 447 | 649- | 435- | 23 |
| Polo Saloon | 6 | | 21 | 8 | 21- | 8- | 6 |
| Polo Estate | 3 | 1- | 21 | 5 | 21- | 5- | 2 |
| Golf | 517 | 71- | 546 | 524 | 576- | 512- | 428 |
| Golf SA | 2 | 2- | | 22 | | 22- | 0 |
| Golf Cabriolet | | | | 6 | | 6- | 9- |
| Golf Estate | 13 | 7- | 44 | 23 | 53- | 23- | 4 |
| Beetle | 27 | 8- | 52 | 113 | 54- | 110- | 19 |
| Bora | 33 | 4- | 105 | 30 | 108- | 30- | 21 |
| Passat Estate | 45 | 3- | 186 | 28 | 194- | 28- | 37 |
| Passat Saloon | 50 | 9- | 28 | 130 | 33- | 128- | 39 |
| Sharan | 2 | 2- | 130 | 24 | 134- | 24- | 9- |
| | | | 31 | | 40- | | |
| Total | 792 | 139- | 1962 | 1399 | 2056- | 1370- | 588 |

Fastpath _____  Data _____                                                                    Rtn ___
F1=Help    F3=Exit    F7=Bkwd    F12=Cancel    F13=Prev month    F14=Next month    F15=Quit
F21=Fastpath    F22=Acq summary

METHOD AND DEVICE FOR CENTRAL SUPPLY CONTROL

FIELD OF THE INVENTION

The present invention relates to a method and a device for central supply control of products, in particular of motor vehicles which have long delivery times from their manufacturing site to the dealers receiving them.

BACKGROUND INFORMATION

Several methods are used for managing the physical distribution of products. Management of physical distribution is important for increasing the efficiency of product distribution, for reducing shipping and storage costs and for increasing customer satisfaction through fast product delivery.

If the production site and the use locations are located in the same region, management of physical distribution can be implemented relatively easily. However, if the production site is overseas, shipping the products takes a very long time, so that efficient management of physical distribution cannot be achieved easily. In particular, transport by ship takes approximately one month. However, the time of transport is not as crucial a factor as product acceptance, production capacity or the marketing strategy, although this is an important point in competing for market share, especially in a market that is almost saturated.

Therefore, it is an object of the present invention to provide a method and a device for central supply control of products, in particular of motor vehicles which have long delivery times from their manufacturing site to the dealers receiving them, so that products may be supplied to individual dealers in a more flexible manner that is consistent with demand.

SUMMARY

The above and other beneficial objects of the present invention are achieved by providing a method and device as described herein.

To this end, the method includes the steps of: a first step in which the inventories are divided into at least two process segments; a second step in which the individual dealers and/or importers are allocated inventories in the respective process segments, the allocated inventories being subdivided into free inventories, non-free inventories and inventories already allocated to consumers; a third step in which a dealer may initiate a search inquiry for a desired product if the desired product is not in his inventories, the search extending to inventories which have not yet been allocated to a consumer, which have not yet been allocated to any dealer, which have been allocated to another dealer but may be acquired without negotiation, and which have been allocated to another dealer but may be acquired only after negotiation with this dealer, where the sequence of the search inquiry among the individual inventories may be made to depend on additional conditions which are stipulated by the dealer and/or the system; and a fourth step in which a product that has been located may be acquired by the dealer, the acquired product being regrouped from its originally allocated inventory into the dealer's inventory.

The method according to the present invention makes it possible to supply individual dealers in a flexible manner that is in line with market requirements without putting any individual dealers at a disadvantage. This makes use of the fact that, because of the long delivery times, a flexible supply control method that is in line with market requirements is possible only through flexible redistribution of inventories that are already on hand. To this end, the individual dealer may not only access his own inventories but also the inventories of the importer as well as other dealers. However, in order not to put individual dealers at a disadvantage, the inventories of each dealer are divided into inventories that are free and those that are not free. This prevents aggressive dealers from taking away unlimited numbers of products from other dealers. Another important aspect is that there is a greater transparency with regard to possible delivery times because of the division of inventories as a function of production segments. This method may also be used with different importers, in which case the individual importers are then to be regarded as dealers. However, the following description is based on a structure having one manufacturer, one importer, and multiple dealers, although the present method is not limited to this example embodiment.

Another method step may be provided, in which the non-free inventories of a dealer are revised to free inventories after a predefined period of time. This arrangement may ensure that a dealer cannot block inventories to an unlimited extent, but will have a period of protection for marketing the products allocated to him.

The acquired product may be allocated to the dealer's non-free inventories if there has not yet been an allocation to a customer and if the product originates from the non-free inventories of another dealer. This arrangement ensures that an individual dealer cannot block free inventories for himself without having a customer for them. On the other hand, the dealer may be able to utilize the periods of protection still associated with the product in successful negotiation with another dealer.

Inventories may be divided into inventories before product completion and inventories after product completion. Product completion may be defined on the basis of the end of assembly, invoicing, loading onto a ship, train or common carrier at the manufacturer's plant, or arrival at the importer's load transfer point.

Each dealer may be assigned a minimum quota and a maximum quota in each process segment.

The oldest product may be searched for first among the inventories in each section of the search if no different additional conditions have been entered, the search being conducted first through the free inventories. This arrangement prevents products in inventories from becoming outdated. However, in the individual case, it may be necessary to deviate from this search procedure on the basis of customer requests regarding delivery times, for example, so that the search may be conducted according to the fastest possible availability. To simplify acquisition, the search may be conducted first in the free inventories that do not require negotiation with other dealers.

After an unsuccessful search among inventories, a production ordering step ma follow in which the individual dealer may order the desired product from the manufacturer.

Inventories may be divided from the standpoint of a dealer as follows:

the dealer's own inventories before product completion;
the importer's inventories before product completion (free inventories);
inventories of other dealers before product completion (non-free inventories);

the dealer's own inventories after product completion;

the importer's inventories after product completion (free inventories);

inventories of other dealers after product completion (non-free inventories);

inventories of other dealers after product completion (free inventories); and inventories which already have a customer allocation (blocked inventories).

Maximum quotas of the post-product completion quotas of individual dealers may be canceled after a predefined period of time. The maximum quota is initially used to protect the other dealers, in order to first ensure a fair distribution of inventories. However, if individual dealers do not utilize their quotas, dealers may be given an opportunity to acquire additional products at a suitable time.

BRIEF DESCRIPTION OF THE DRAWINGS

FIGS. 3a to 3c illustrate a flowchart of a method for central supply control according to the present invention.

FIG. 4 is a screen display of a dealer's quota.

FIG. 5 is a screen display of a vehicle movement of one dealer.

FIG. 6 is a screen display of quotas of all dealers.

FIG. 7 is a screen display of vehicle movements of all dealers.

DETAILED DESCRIPTION

Figure 1:
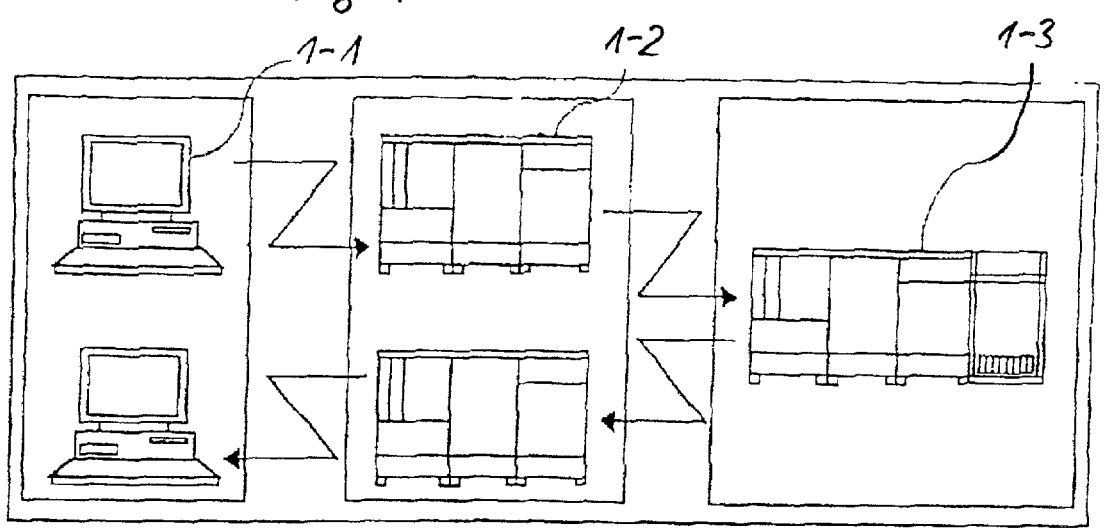
FIG. 1 is a schematic view of a device for central supply control according to the present invention.

FIG. 1 is a schematic block diagram of a device for central supply control. Device 1 includes a plurality of computers 1-1, each being assigned to one dealer, only one computer 1-1 being illustrated for simplicity. In addition, the device includes a computer 1-2 of an importer and a computer 1-3 of the manufacturer who may be overseas, for example. The device manages the total inventories between the production site and the dealer, although the production site is overseas and a long shipping time is required, i.e., until the products arrive on the national market. This device not only manages vehicles in production but also manages the vehicles on the ships, national inventories as well as dealers' inventories. As illustrated in FIG. 1, a production order made by a dealer on computer 1-1 is sent via computer 1-2 of the manufacturer's national branch to computer 1-3 of the manufacturer's central office or production site. Information entered into computer 1-3 at the manufacturer's central office or production site may also be sent to dealer's computer 1-1. Central inventory management, allocation of quotas and supply control may be handled through the importer's computer 1-2. The importer's computer 1-2 is especially suitable as the control center for the following reasons. First, all dealers' inventories may be stored physically and managed centrally by the importer. In addition, there are not usually any direct contracts between dealers and the manufacturer, and dealers instead have a contract with the importer, and the importer has a contract with the manufacturer. Furthermore, the importer is responsible for maintaining the quotas of his dealers.

Figure 2:
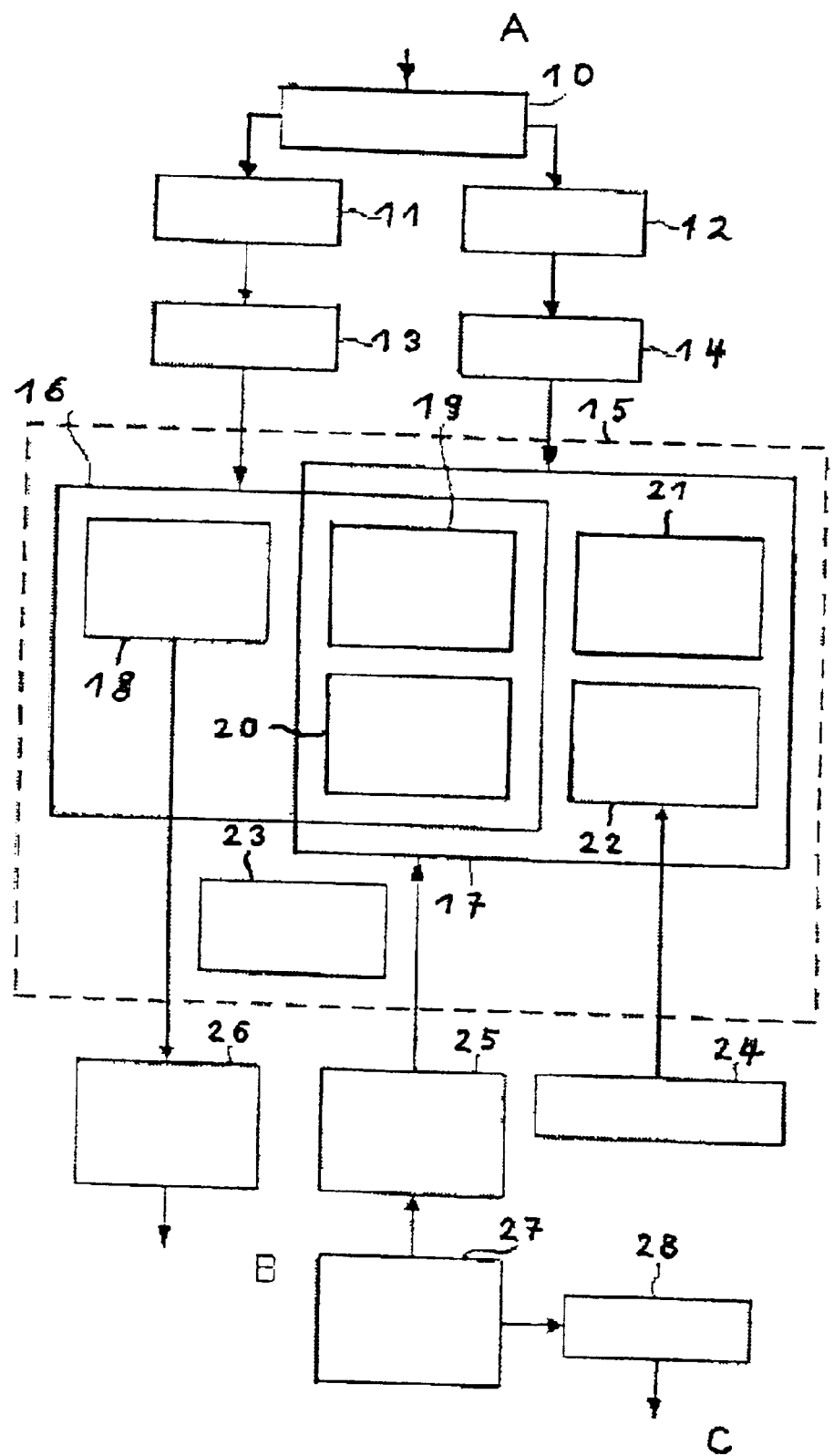
FIG. 2 is a schematic view of a device for central supply control according to the present invention.

FIG. 2 is a block diagram of the device for central inventory management and supply control. In "calculation of allocation quota" 10, a dealer's respective allocation quota 10 is calculated as a function of annual sales target A. Thus, each individual dealer has room to maneuver, as explained in greater detail below. Allocation quota 10 is divided into a "pre-product completion quota" 11 and a "post-product completion quota" 12. "Pre-product completion quota" 11 and "post-product completion quota" 12 constitute restrictions for dealers in searching among inventories and in acquiring a vehicle from inventories. Most of the "pre-product completion quota" 11 is formed by dealers' production orders which are assigned at the production site. "Post-product completion quota" 12 is the quota of all inventories after product completion, with production completion being defined either as the end of assembly, loading onto a ship or arrival at the importer's load transfer point.

Before explaining the block diagram illustrated in FIG. 2 further, the definition of annual sales target A and the "calculation of allocation quota" 10 will first be explained in greater detail. In an individual process, the importers define the market demand, which they pass on to the manufacturer. The manufacturer compares the available production capacities to this demand. In a process based on numerous discussions and committee meetings, a production program is established between the importers and the manufacturer. The importers use this as a basis for negotiating annual sales targets A with the dealers. This is a revolving process to allow adaptation to the market, if necessary. In addition, it may be necessary that the incoming order situation be analyzed constantly by the dealers and used as input in the planning process.

The following considerations are based on the following schedule: M1 is the current month, M2, M3, etc. are the following months. If the period unit is weekly, this system would be applied in an analogous manner, W1 being the current week, W2, W3, etc. being the following weeks.

Each month, seasonal sales targets are derived for each product model on the basis of the planned annual sales targets as well as those targets agreed upon with the dealers. At the same time, a minimum stock per product model that may be ordered is agreed upon with the dealer. On the basis of the sales volumes stipulated with the importers, the manufacturer also stipulates the production volumes on a seasonal basis.

Of these volumes, the importers receive their respective shares, which are reflected in an order management system as capacities to be filled (partially broken down to certain product properties, if these are to be restrictive in production).

On the basis of the sales targets, and therefore also oriented toward these capacities, the supply control system at the importer's location calculates for each dealer his share of this production capacity (if necessary, also for important product properties that are available in short supply to provide additional assurance of fair distribution). From the mean of these shares for months M2, M3 and M4, the system calculates the pre-product completion quota for the individual dealer (including a minimum and a maximum). Likewise, the post-product completion quota is also calculated with a minimum and a maximum, based on the agreed upon minimum inventory and taking into account the current stock per product model. The sales targets of months M1, M2 and M3 are used as the basis for this calculation.

The various time windows (M1, M2, M3 and M2, M3, M4) are obtained because the production run of an order (approximately one month) is to be taken into account in the pre-product completion quota. However, only existing products are managed in the post-product completion quota. Taking into account a rolling time window of three months ensures that pronounced seasonal trends may be reflected at an early stage in calculating quotas.

Thus, each dealer has quotas between which he may move freely, namely the minimum pre-product completion quota;

the maximum pre-product completion quota;

the minimum post-product completion quota; and the maximum post-product completion quota.

Examples of possible calculations for individual quotas are given below.

For example, the minimum pre-product completion quota is calculated as follows:

24% (M2+M3+M4)

which corresponds to 72% of the calculated mean monthly quota. In this context, the minimum pre-product completion quota may be between 70% and 80% of the calculated monthly quotas.

The maximum pre-product completion quota, for example, is calculated as follows:

(production quota of the month+pre-product completion quota of the importer)*(sum of the sales targets of a dealer for M2+M3+M4)/(sum of the sales targets of all dealers for M2+M3+M4).

The minimum post-product completion quota is calculated as follows, for example:

20% (M1+M2+M3)

which corresponds to 5% of the annual sales target. In this case, the minimum post-product completion quota may be between 5% and 8% of the annual sales target.

The maximum post-product completion quota, for example, is calculated as follows:

(total post-production completion inventory of the importer+total post-production completion inventory of all dealers)*(sum of the sales targets of a dealer for M1+M2+M3)/(sum of the sales targets of all dealers for M1+M2+M3) (post-production completion inventory of a dealer).

The function of the minimum and maximum quotas will be explained here briefly.

Minimum quotas are obligatory for the dealer within the framework of a process agreement and are to be met within the quota period (usually one month). If a dealer does not meet his minimum quota by the end of the quota period, it will automatically be met by the system (with vehicles suitable for the market from importer's inventories according to the quota affected).

The maximum is an opportunity which may be met but need not be met. However, it provides hard-working dealers an opportunity to make sales beyond the targets agreed upon.

Newly ordered products of a dealer are non-free inventories within a period of protection until a certain time after the order (e.g., up to 10 days or 30 days after arrival of the product in the importer's warehouse). In other words, other dealers may have access to these products only after negotiating with this dealer. This period may ensure the dealer who is ordering, that he alone has the opportunity to sell the "fresh" product. If the product has still not been sold after this period of protection, it is automatically transferred to the free inventories, without this altering the conditions of ownership. The duration of the period of protection may be defined on the basis of national factors.

Each product acquisition (dealer from importer, dealer from dealer) and new order by a dealer is taken into account in fulfilling the quotas, both negatively and positively. An acquisition from free dealer inventories is possible only if a customer allocation is made at the same time. An acquisition from (always) free importer inventories is possible even without a customer allocation. The product is then allocated financially to the dealer. An acquisition of non-free dealer inventory (within the period of protection) is possible even without a customer allocation. The product is then allocated financially to the acquiring dealer. A new order as part of the pre-product completion quota is possible at any time.

All products that have not already been sold to customers at the time of arrival at the importer's load transfer point will remain at the importer's load transfer point until being sold to a customer by a dealer. The dealer does not store unsold products on his premises except for his showroom vehicles.

Since, from a dealer's standpoint, any product movement, whether acquiring or handing over a product, is taken into account in the corresponding quota, a dealer may even fall below a minimum that had already been reached in the quota period. If this occurs, he receives a new quota or quotas in order to allow him to at least meet the stipulated minimum. This is true only if the minimum quota is greater than zero. This method ensures that no dealer is at a disadvantage due to the product exchange and that product exchange is an equivalent mechanism for satisfying a customer's request, or more precisely filling a quota or rendering a performance. This method thus promotes the use of the entire product offering in the "pipeline" by the dealers and therefore greatly increases the inventory turnover factor. The exact sequence is explained in greater detail below on the basis of FIGS. 3a to 3c.

First, however, the block diagram illustrated in FIG. 2 will be explained further.

For management of entire inventories, this device divides all inventories including inventories still in production, inventories in transport (ship, rail, etc.), national inventories and dealers' inventories into the categories "reserved inventories" 23, "dealer's inventories" 22, "free inventories (no negotiation necessary)" 21, "non-free inventories (negotiation required)" 19, "importer's inventories" 20 and "orderable inventories" 18. Inventories that have not yet been produced are also handled as inventories.

"Reserved inventories" 23 are inventories ordered online by a dealer from the manufacturer for a specific buyer. To prevent dummy orders, a dealer may not alter the name of the buyer after making such an entry. Reserved inventories are no longer visible in the system to other dealers and therefore may not even be reserved. They are so-called blocked or reserved vehicles.

"Dealer's inventories" 22 are inventories held by a dealer locally but for which no buyer has yet been found. A dealer's showroom vehicles are also included in "dealer's inventories" 22.

"Free inventories" 21 do not require negotiation. These include dealer's vehicles for which no delivery order has yet been received or no buyer has been found more than 30 days after arrival at the importer's load transfer point. However, responsibility for free inventories remains with the dealer who ordered them.

With a delivery order (call off), a dealer initializes transport of a vehicle from the importer's central warehouse to the dealer's place of operation if he requires this vehicle in his inventory for delivery to a customer or to fulfill his showroom inventory.

"Non-free inventories" 19 include the following vehicles:
(1) Vehicles, the production of which was stipulated, up to 30 days after arrival at the importer's load transfer point, for example.
(2) Dealer's inventories (showroom vehicles at the dealer).

If no delivery order has been received or no buyer has been found for the vehicles after a certain period of time has elapsed (in this case, 30 days after arrival at the importer's load transfer point), the vehicles are changed from non-free inventories to free inventories.

Importer inventories 20 include vehicles ordered by the importer. Importer inventories 20 are always free inventories, as well.

Orderable vehicle models 18 are vehicle models which may be ordered from the production site after an unsuccessful search among inventories.

Data on orderable vehicle models 18, non-free inventories 19 and importer inventories 20 are the components of pre-production completion inventories 16. This inventory 16 represents the search range in which a dealer may make an inquiry within his pre-production completion quota 11 in a first search step 13. Users of this system may inquire about a vehicle within these pre-production completion inventories 16 by using first search step 13 and may acquire a vehicle or order it anew.

Non-free inventories 19, importer inventories 20, free inventories 21 and dealer inventories 22 are the components of post-production completion inventories 17. This inventory 17 represents a search range in which a dealer may make an inquiry within his post-product completion quota 12 in a second search step 14. Users of this system may inquire about a vehicle within these post-production completion inventories 17 by using second search step 14.

Reserved vehicles 23 are vehicles reserved for a specific customer. These vehicles are registered as inventories until they are picked up, but they may not be acquired by other dealers and they do not show up in search inquiries by other dealers.

The components of total inventories 15 include orderable vehicle models 18 up to reserved vehicles 23.

A check is performed in "change in inventory models" 25 to determine whether 30 days have already elapsed after arrival at the importer's load transfer point. If this period of time has elapsed, the inventory models of vehicles are changed from non-free inventories to free inventories. During the "non-free period" during which a negotiation is required to acquire a vehicle, only dealers that have ordered the vehicle may sell the vehicle without negotiation. During the "free period," other dealers may also sell the vehicle if they find a buyer for the vehicle. Mobility and flexibility of inventories are increased in this manner.

In "limitation of dealer inventories" 24, dealer inventories are limited for individual vehicle models. The aim of this limitation is for inventories to be held physically by the importer rather than the individual dealers. This arrangement may increase the mobility of inventories. The following disadvantages may occur if inventories of individual dealers are too high:
(1) Sale of a vehicle must be negotiated because the inventories are not "free inventories" as is the case with importer inventories but instead are divided into "free inventories" and "non-free inventories," which results in poor mobility of inventories.
(2) The quality of inventories may deteriorate due to prolonged storage under improper conditions, and customer satisfaction may decline.
(3) There may be an enormous increase in the dealer's costs.

Therefore, it is advantageous to keep dealer inventories as low as possible by limiting them, in which case the dealers may only have showroom vehicles physically on site.

Orders are regularly revised or processed in "revision or processing of order" 28.

By using this system, dealers may acquire vehicles not only easily but also efficiently (without waste) because the quota is defined and the inventories are categorized. To acquire a vehicle from "non-free inventories," a dealer must negotiate successfully with other dealers. A dealer may acquire a vehicle from "free inventories" without negotiation, but there must be a buyer. A dealer may acquire a vehicle from the importer inventories without negotiation, regardless of whether or not there is a buyer.

Figure 3A:
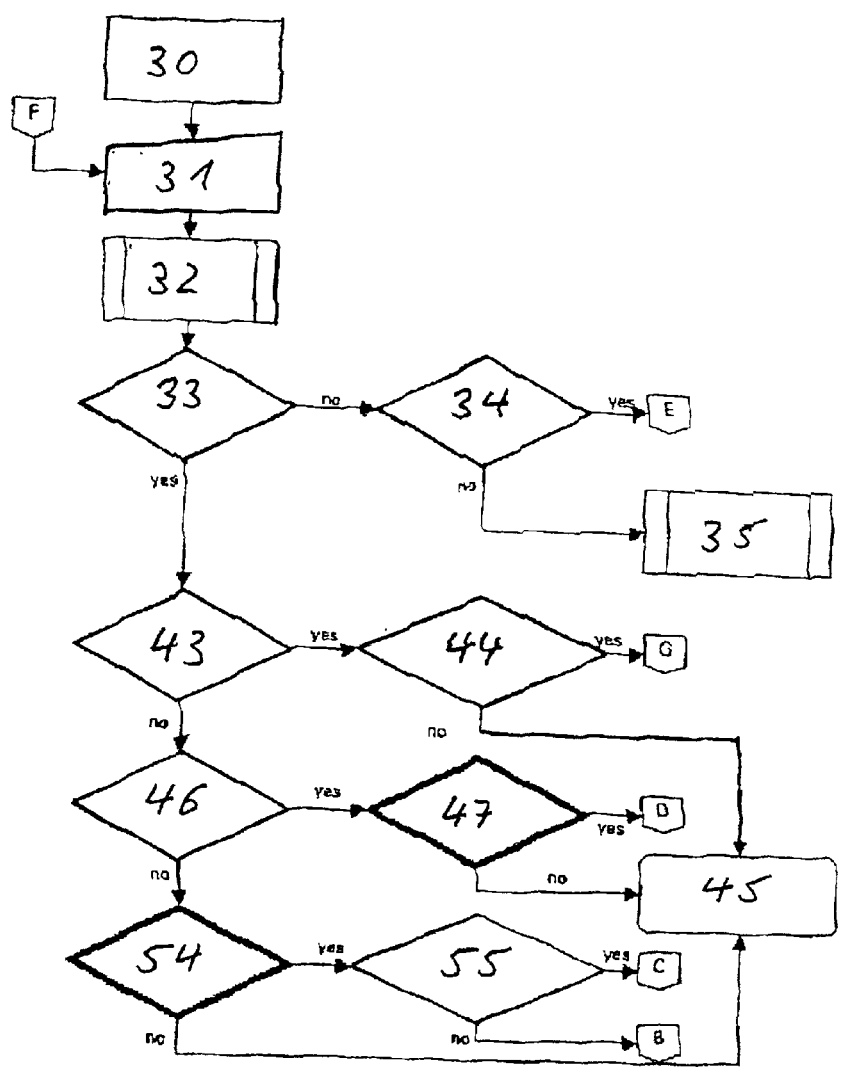
Figure 3B:
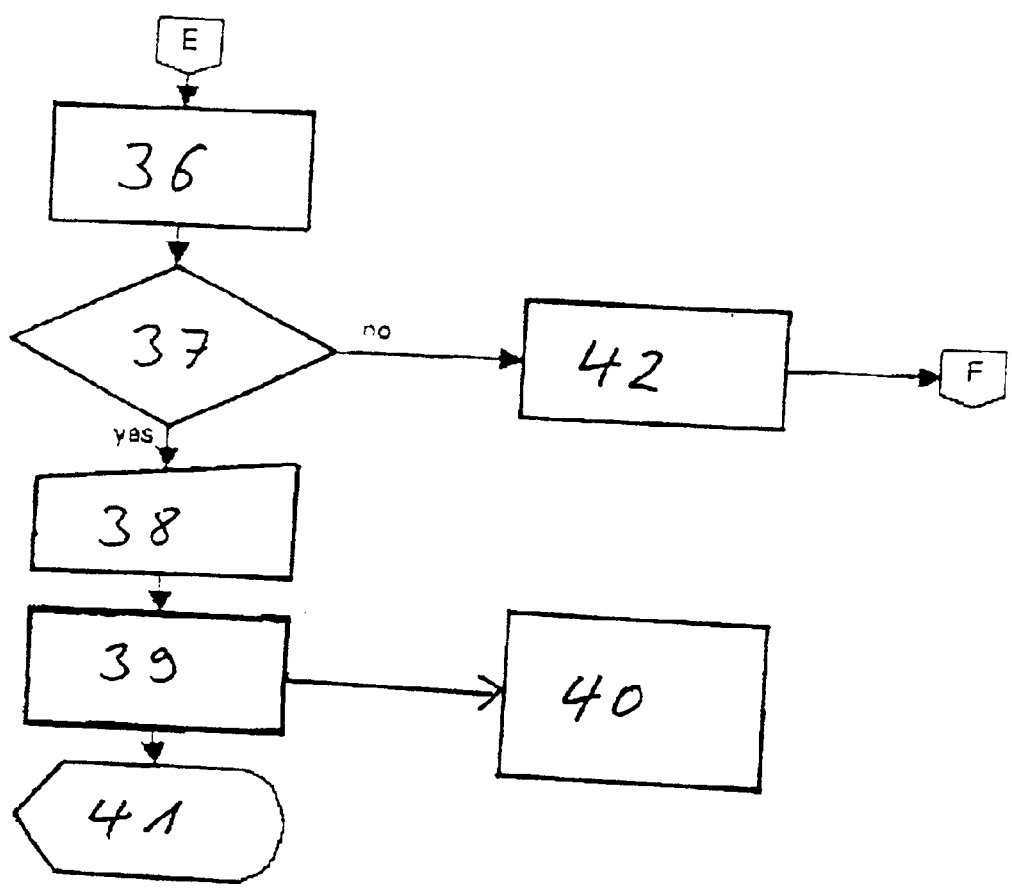

The method sequence is illustrated in FIGS. 3a to 3c.

In a first step 30, the method is begun, with the triggering factor being a customer inquiry or a dealer's request to replenish his inventories. In a next step 31, the dealer is first requested to provide vehicle specifications. The specification features include, in particular, the vehicle model, color and equipment. Then, the actual search process is performed in step 32, although the precise sequence will not be considered in greater detail. In step 33, the procedure branches off according to whether or not the vehicle being sought has been located. If no vehicle is located the dealer is asked in step 34 whether he would like to make a product order. If he answers in the negative, the method is terminated in step 35. As an alternative, there may then be the option of searching for the desired product in the importer inventories in neighboring countries. However, if a product order is desired, the dealer is requested in step 36 (FIG. 3c) to specify the product order according to his remaining or future pre-product completion quota, so that the projected delivery time may be determined. In step 37, the customer is asked whether he consents to this delivery date. If the customer gives his consent, the order is specified in step 38 (with additional customer information), and in step 39, it is transmitted to the importer. In step 40, the importer transmits the order to the manufacturer. In addition, in a step 41, the newly ordered vehicle is counted toward the dealer's pre-product completion quota. However, if the customer does not consent to the proposed delivery date, the dealer will negotiate with the customer regarding alternative specifications in step 42 (e.g., a different color). If the renegotiation is unsuccessful, the procedure is concluded. Otherwise it begins again at step 31.

However, if a vehicle was found in step 33, then, in step 43, there is an inquiry to determine whether it is a vehicle from the dealer's inventory. If this is the case, an inquiry regarding the delivery time is made in step 44. If this is acceptable to the customer, the procedure continues with step 38. However, if the delivery time is not acceptable to the customer, an inquiry must be made in step 45 to determine whether the customer will accept a different specification (continuing then with step 31) or whether the procedure is to be terminated. However, if the inquiry according to step 43 does not concern the dealer's own vehicle, then a check is performed in step 46 to determine whether the vehicle comes from the pre-product completion inventories. If this is the case, an inquiry is made in step 47 to determine whether the dealer still has any remaining pre-product completion quota. If this is not the case, an inquiry is made again in step 45 to determine whether a new search (step 31) is to be performed or whether the procedure is to be terminated. In addition, the dealer is asked whether he wants to use a future quota, so the procedure continues with step 36. However, if the dealer still has a pre-product completion quota, then an inquiry is made in step 48 (FIG. 3c) to determine whether the vehicle comes from the importer's pre-product completion inventory. If this is the case, then the vehicle is posted to the dealer in step 49. Then in step 50, the dealer is asked whether he would like to request the vehicle immediately as soon as it has arrived physically at the importer's location, so that it is also delivered physically from the importer to the dealer. If the dealer or customer desires immediate delivery, this information is transmitted to the importer's computer, where it is stored in step 51. If the dealer or customer desires delayed delivery, delivery may be delayed in step 52 within a time window of four to eight weeks, for example, and this information is transmitted to the importer's computer, where it is stored again in step 51. In step 53 the reallocated vehicle is then counted with the dealer's pre-product completion quota.

However, if the inquiry in step 48 reveals that the vehicle does not belong to the importer's inventories, it must be a vehicle from another dealer's non-free inventories. In step 56, there is then a negotiation with the other dealer. In step 57, an inquiry is made to determine whether the negotiation was successful. If this is the case, the procedure continues in step 49. Otherwise, an inquiry is made in step 58 to determine whether a new search should be started or if the procedure is to be terminated.

However, if the vehicle found is a vehicle from the post-product completion inventories, then an inquiry is made in step 54 to determine whether the dealer still has a post-product completion quota. If this is not the case, then an inquiry is again made in step 45 to determine whether the next quota (for the next month) should be used, whether a new search should be initiated or whether the procedure should be terminated. However, if the dealer still has a post-product completion quota, then an inquiry is made in step 55 to determine whether the vehicle found comes from the post-product completion inventories. If this is the case, the procedure continues with step 49. However, if the inquiry in step 55 reveals that the vehicle does not come from the importer's inventories, then it must be a vehicle from another dealer.

Therefore, a check is first performed in step 59 to determine whether the vehicle belongs to the non-free inventories. If this is the case, a negotiation must again be performed with another dealer in step 56. However, if the vehicle comes from free inventories, an inquiry is performed in step 60 to determine whether there is a customer. If this is the case, the procedure continues with step 49. Otherwise it continues with step 58.

With regard to the search strategy in step 32, the following comments may be made. The sequence of the search in the respective inventories depends on which parameter is to be optimized, with the strategies partially overlapping. Possible search criteria include, for example, the age of the product, the status in the delivery pipeline or the simplicity of the reservation. In the case of simplicity of reservation, first the free inventories are searched, whereas in the case of the age of the product and the status in the delivery pipeline, the post-product completion inventories are searched first. However, the dealer's own post-product completion inventories may always be searched first. Which criterion is the main criterion depends, among other things, on the distance of the country from the production site or the average delivery time requirement of the customer.

The method according to the present invention results in an increased inventory turnover due to the motivation and the safeguarding of product exchanges and a high flexibility in transactions due to the flexible quotas. Because of the transparent control system, each dealer may find out at any time whether or not his quotas or those of other dealers have been met. Due to the transparency and clear distribution rules, the method according to the present invention creates confidence because all dealers are treated equally by the manufacturer even in the event of a temporary oversupply or undersupply. In addition, due to the central storage of vehicles at the importer's location, considerable costs are reduced for storage by individual dealers and for cross-shipping from individual dealers to one another.

The individual dealer as well as the importer must have an opportunity to obtain at any time information giving an overview of quotas distributed and met, which is accomplished through the computers assigned to them. FIG. 4 illustrates such an arrangement for a certain dealer as an example. The left-hand column indicates the individual vehicle models. The next column indicates the respective minimum post-product completion quota for the individual vehicle model (stock and transit minimum). Next to that is the respective maximum post-product completion quota, where the symbol * indicates that the maximum quotas have been canceled. The next two columns indicate the minimum and maximum pre-product completion quotas, respectively. The last two columns indicate whether the post- and pre-product completion quotas have been met (these may also be negative). This may be explained using the example of the "Lupo" model, where "3−" means that three vehicles of the Lupo model have been acquired from his stock by other dealers. However, a minus in meeting a quota must only be compensated if the minimum quota is greater than zero. However, if the minimum quota is zero, as in the present example, there is no mandatory acquisition.

Then, however, the reduction in stock (−3 here) is taken into account in the next quota calculation.

The "0" in the pre-product completion quota (Prod) means that the dealer has not yet ordered a Lupo model vehicle from the manufacturer, so he must still order two of these vehicles to meet his minimum pre-product completion quota. Accordingly, FIG. 6 is a diagram for the sum of all dealers.

FIG. 5 illustrates, as an example, the vehicle movements of a dealer, with the different vehicle models again being indicated in the left-hand column. The next column indicates the acquisitions by the dealer from the importer inventories, and the next column indicates the corresponding reversed transactions. The next two columns indicate the vehicle additions, with the first column (Mand) indicating acquisitions from other dealers' free stocks and the second column (Neg) indicating acquisitions from the non-free inventories of other dealers after negotiation with them. The next two columns indicate the subtractions from the dealer's inventory of vehicles, and the last column indicates the balance of additions and subtractions. This will be explained again briefly in greater detail on the basis of the Lupo vehicle model. As indicated by the first four columns, the dealer has not acquired a Lupo from the importer or from other dealers. On the other hand, other dealers have acquired two Lupos from his free inventories and one Lupo from his non-free inventories after negotation, resulting in minus three vehicles in total (see also FIG. 4). FIG. 7 illustrates the vehicle movements for all the dealers.

What is claimed is:

1. A method for central supply control of products, having long delivery times from a manufacturing site to dealers, via a data network having at least one central data bank, each dealer being allocated at least one computer configured to make data inquiries to centrally managed data in the data bank of at least one of an assigned importer and manufacturer, the method comprising the steps of:

(a) dividing inventories into at least two process segments;

(b) allocating the inventories in the respective process segments to at least one of individual dealers and importers, the allocated inventories being subdivided into free inventories, non-free inventories and inventories allocated to ultimate consumers;

(c) performing a search inquiry for a desired product by a dealer in accordance with the allocated computer, the starch extending to inventories that have not been allocated to the ultimate consumer and that have been allocated to another dealer but are acquirable after negotiation with the another dealer, wherein a sequence of the search inquiry among inventories is performed selectively in accordance with at least one condition stipulated by at least one of the dealer and the data network; and (d) acquiring a product located by the dealer, the acquired product being regrouped from an originally allocated inventory to the dealer's inventory.

2. The method according to claim 1, further comprising the step of revising non-free inventories of a dealer to free inventories after a predefined period of time.

3. The method according to claim 1, further comprising the step of allocating the acquired product to the dealer's non-free inventory if the acquired product has not been allocated to a customer and if the acquired product originated from the non-free inventory of another dealer.

4. The method according to claim 1, further comprising the step of (e) dividing inventories into inventories before product completion and inventories after product completion.

5. The method according to claim 1, further comprising the step of assigning to each dealer a minimum quota and a maximum quota in each process segment.

6. The method according to claim 1, wherein the step (c) includes the substep of searching an oldest product first among the inventories if no conditions are stipulated, the search being performed first through free inventories.

7. The method according to claim 1, further comprising the step of performing a production ordering step in response to an unsuccessful searching step.

8. The method according to claim 4, wherein the inventory of a dealer is divided in the dividing step (e) into:

the dealer's free inventories before product completion;

the importer's free inventories before product completion;

non-free inventories of other dealers before product completion;

the dealer's inventories after product completion;

the importer's free inventories after product completion;

non-free inventories of other dealers after product completion;

free inventories of other dealers after product completion; and blocked inventories having a customer allocation.

9. The method according to claim 5, further comprising the step of canceling the maximum quota of a post-product completion quota after a predefined period of time.

10. A device for central supply control of products having long delivery times between a manufacturing site and dealers, comprising:

a data network including at least one central data bank, each dealer being allocated one computer configured to make inquiries to centrally managed data in the data bank, inventories in the data bank being divided into at least two process steps and being allocated to at least one of individual importers and dealers, the allocated inventories being subdivided into free inventories, non-free inventories and inventories allocated to consumers, the computer being configured to perform a search inquiry for a desired product in the central data bank initiated by at least one of a dealer and an importer, the search extending to warehouse inventories that have not yet been allocated to a consumer, have not yet been allocated to a dealer, have been allocated to another dealer but are reservable without negotiation and have been allocated to another dealer but are reservable only after negotiation with the another dealer, wherein a sequence of the search inquiry among the inventories is selectively performed on at least one additional condition stipulated by at least one of the dealer and the data network and wherein a product that has been located is acquirable for the dealer and transferable to the allocation of the dealer.

11. A computer-readable storing medium storing a set of instructions, the set of instructions capable of being executed by a processor arrangement to implement a method for central supply control of products, having long delivery times from a manufacturing site to dealers, via a data network having at least one central data bank, each dealer being allocated at least one computer configured to make data inquiries to centrally managed data in the data bank of at least one of an assigned importer and manufacturer, the method including the steps of:

(a) dividing inventories into at least two process segments;

(b) allocating the inventories in the respective process segments to at least one of individual dealers and importers, the allocated inventories being subdivided into free inventories, non-free inventories and inventories allocated to ultimate consumers;

(c) performing a search inquiry for a desired product by a dealer in accordance with the allocated computer, the search extending to inventories that have not been allocated to the ultimate consumer and that have been allocated to another dealer but are acquirable after negotiation with the another dealer, wherein a sequence of the search inquiry among inventories is performed selectively in accordance with at least one condition stipulated by at least one of the dealer and the data network; and (d) acquiring a product located by the dealer, the acquired product being regrouped from an originally allocated inventory to the dealers inventory.

12. The computer-readable storing medium according to claim 11, wherein the method further includes the step of revising non-free inventories of a dealer to free inventories after a predefined period of time.

13. The computer-readable storing medium according to claim 11, wherein the method further includes the step of allocating the acquired product to the dealer's non-free inventory if the acquired product has not been allocated to a customer and if the acquired product originated from the non-free inventory of another dealer.

14. The computer-readable storing medium according to claim 11, wherein the method further includes the step of (e) dividing inventories into inventories before product completion and inventories after product completion.

15. The computer-readable storing medium according to claim 11, wherein the method further includes the step of assigning to each dealer a minimum quota and a maximum quota in each process segment.

16. The computer-readable storing medium according to claim 11, wherein the step (c) includes the substep of searching an oldest product first among the inventories if no conditions are stipulated, the search being performed first through free inventories.

17. The computer-readable storing medium according to claim 11, wherein the method further includes the step of performing a production ordering step in response to an unsuccessful searching step.

18. The computer-readable storing medium according to claim 14, wherein the inventory of a dealer is divided in the dividing step (e) into:

the dealer's free inventories before product completion;

the importer's free inventories before product completion;

non-free inventories of other dealers before product completion;

the dealer's inventories after product completion;

the importer's free inventories after product completion;

non-free inventories of other dealers after product completion;

free inventories of other dealers after product completion; and blocked inventories having a customer allocation.

19. The computer-readable storing medium according to claim 15, wherein the method further includes the step f canceling the maximum quota of a post-product completion quota after a predefined period of time.

* * * * *

UNITED STATES PATENT AND TRADEMARK OFFICE
CERTIFICATE OF CORRECTION

PATENT NO. : 6,847,941 B2 Page 1 of 1
DATED : January 25, 2005
INVENTOR(S) : Ower It is certified that error appears in the above-identified patent and that said Letters Patent is hereby corrected as shown below:

Title page,
Item [75], Inventor, change "Brafileld" to -- Brafield --.

Signed and Sealed this

Sixth Day of December, 2005

JON W. DUDAS
*Director of the United States Patent and Trademark Office*